United States Patent [19]

Kohlwey

[11] Patent Number: 4,585,664

[45] Date of Patent: Apr. 29, 1986

[54] METHOD FOR PRODUCING RICE COMPOSITION AND PRODUCT

[75] Inventor: David E. Kohlwey, Houston, Tex.

[73] Assignee: Riviana Foods Inc., Houston, Tex.

[21] Appl. No.: 600,369

[22] Filed: Apr. 16, 1984

[51] Int. Cl.$^4$ .............................................. A23L 1/168
[52] U.S. Cl. .................................... 426/619; 426/620
[58] Field of Search .............. 426/619, 800, 801, 618, 426/620, 621, 626

[56] References Cited

U.S. PATENT DOCUMENTS

| | | | |
|---|---|---|---|
| 3,467,528 | 9/1969 | D'Ercole et al. | 426/93 |
| 3,526,514 | 9/1970 | Gralak et al. | 426/620 |
| 3,690,894 | 9/1972 | Kelly et al. | 426/621 |
| 3,961,087 | 6/1976 | Zukerman | 426/618 |
| 4,438,150 | 3/1984 | Gantwerker et al. | 426/619 |
| 4,440,794 | 4/1984 | Daires | 426/618 |

FOREIGN PATENT DOCUMENTS 220657 6/1983 Japan .................................... 426/618

OTHER PUBLICATIONS

21 CFR 182, 1748.
21 CFR 184, 1193.
National Academy of Sciences-National Research Council 1965, Chemicals Used in Food Processing, pp. 45, 263.
Furia (Editor) 1972 CRC Handbook of Food Additives, vol. 1, CRC Press Cleveland, OH, pp. 619, 624–627.

*Primary Examiner*—Raymond Jones
*Assistant Examiner*—Carolyn Paden
*Attorney, Agent, or Firm*—Delmar L. Sroufe

[57] ABSTRACT

A dry instant rice porridge mix reconstitutable in milk is prepared by mixing instant rice with a thickener, nonfat dry milk solids, and an alkaline metal pyrophosphate. The porridge mix is also reconstitutable in water with the addition of dry milk solids.

34 Claims, No Drawings

METHOD FOR PRODUCING RICE COMPOSITION AND PRODUCT

BACKGROUND OF THE INVENTION

This invention relates to methods for producing rice products and those products, and more particularly, relates to methods for producing dry instant rice porridge mixes and the mixes.

Rice porridge is a traditional product consumed primarily in Scandinavian and other European countries, but it is also consumed in many Latin-American countries. It is conventionally prepared by boiling rice in milk for about an hour and results in cooked rice in a creamy sauce or matrix. It is eaten warm or hot as an entree or holiday food, usually with cinnamon sugar, butter, and/or milk added just before it is eaten. It may also be served as a left-over or snack food.

However, the preparation of this product is both long and tedious, since the milk must be constantly stirred to pevent scalding during the cooking process. This is true even if precooked, or "instant", rice is employed as the starting product for the rice. For precooked rice, or instant rice, the rice must still be cooked for a long time to allow starch to dissolve or leach out of the rice grains, and in combination with milk solids to provide the requisite texture to the final product.

Applicant is not aware of any prior art relating to instant rice porridge mixes having identifiable rice grains. Applicant is aware of a semi-long cook porridge rice, "Ming Grot-Ris", manufactured by Appotecus Labitorium of Norway. This "Ming" rice requires about 15 minutes of simmering and is believed to employ thermally cycled rice similar to that described in U.S. Pat. No. 3,189,426. However, the "Ming" rice requires more cooking time and attention than the mixes of the present invention.

Further, Applicant is aware of U.S. Pat. No. 3,467,528 which discloses a dry rice pudding mix, that has dry mix materials coated on the surface of precooked rice grains. Although characterized as a "precooked" rice, the mix of this patent employs what is conventionally (by the rice processing industry) called an instant rice. An instant, or "instantized" rice as used herein and as generally used by the rice processing industry means a rice which is ready for consumption (i.e., fully gelatinized and rehydrated to a 60-80% moisture content) after being placed in hot or boiling water which is heated or reheated to boiling, removed from heat and thereafter allowed to stand for about five minutes (i.e., a pregelatinized rice).

One of the mix materials coating the rice for the aforementioned dry rice pudding mix is starch, which serves to help thicken the pudding; this starch substitutes for the starch cooked out of the rice grains during the conventional rice pudding preparation process. Further, even though the rice ingredient is precooked, or instantized, this pudding mix requires about ten minutes of simmering (because of the mix coating the rice) in milk to produce a product which is then cooled, or chilled, and eaten. This pudding composition differs from the porridge mix of the present invention, among other ways, in that this pudding mix is formulated to provide a food with the desired texture, consistency and appearance after it is cooled or chilled, whereas a porridge is formulated to be eaten hot, or warm. Additionally, pudding mixes contain sugar which may serve as an additional thickening agent (in addition to the starch) while the porridge mixes of the present invention do not contain sugar.

These and other limitations and disadvantages of the prior art are overcome by the present invention, however, and dry instant rice porridge mixes are provided together with improved methods for producing dry instant dehydrated rice porridge mixes.

SUMMARY OF THE INVENTION

In a preferred embodiment of the present invention a preferred method for producing a dry instant rice porridge mix is provided. This preferred method mixes instantized (or pregelatinized), broken and whole grain, medium grain rice with uncooked granulated medium grain rice, non-fat dry milk solids, an alkaline metal pyrophosphate, and preferrably an alkaline metal orthophosphate, or a calcium salt. An alternative method also adds butterfat or butterfat substitutes and an antioxidant to the preferred mix to allow for reconstitution in water.

It is an object of the present invention to provide a dry instant rice porridge mix.

It is also an object of the present invention to provide a method for producing a dry instant rice porridge mix.

It is another object of the present invention to provide a dry instant rice porridge mix that is brought to a boil in milk, removed from heat, and has excellent flavor and consistency about five minutes after it reaches boiling.

It is yet another object of the present invention to provide a dry instant rice porridge mix that is brought to a boil in water, removed from heat, and has excellent flavor and consistency about five minutes after it reaches boiling.

It is still another object of the present invention to provide a dry instant rice porridge mix which, after preparation, maintains a texture substantially similar to the texture of a long-cook product, as it is cooled or aged.

These and other objects and advantages of the present invention will become apparent from the following detailed description.

DETAILED DESCRIPTION

The present invention provides methods for producing a dry instant rice porridge mix. The preferred mix may be added to milk, brought to a boil with stirring, removed from heat, and eaten after standing for about five minutes. A mix prepared according to an alternate method of the invention may be added to water, brought to a boil with stirring, removed from heating, and eaten after standing for about five minutes. After the five minute standing period, the rehydrated mixes of the present invention have the appearance, texture, flavor and consistency of freshly prepared rice porridge which has been prepared by the conventional long-cook process.

The methods of the present invention preferably use instantized whole grains and broken grains (hereinafter "brokens") of rice, both of which may be instantized together in a conventional manner. The rice may be instantized by employing a process similar to that disclosed in U.S. Pat. No. 2,828,209, or other similar processes. The instantizing or precooking process is not considered to be part of the present invention and is discussed only for completeness and clarity of meaning.

The whole rice is preferably mixed with brokens to provide an economically suitable porridge texture and appearance. One suitable mixture has been found to have the proportions of about 25% whole grains to about 75% brokens, by weight. Preferably, rice with a high content of amylopectin is employed to make this mixture. Such rice may be any conveniently available high amylopectin content rice, such as for example, but not limited to, medium or short grain rice. This mixture of whole grains and brokens is then instantized as discussed hereinabove. In accordance with a method of the present invention, this mixture of whole grains and brokens is in an amount of about 70 to 90 percent by weight of the dry instant rice porridge mix.

According to the methods of the present invention, granulated raw rice of any conveniently available type rice, but preferably medium grain, is then added to this instantized brokens and whole rice mixture. In an embodiment of the present invention, the granulated rice is in an amount of about 4 to 15% by weight of the dry instant rice porridge mix.

In accordance with the preferred method of the present invention, non-fat dry milk is then added to this mixture of rice and granulated raw rice. The non-fat dry milk is in an amount of about 9 to 12% of the total weight of the dry instant rice porridge mix. Alternatively, the dry milk proportion may be increased so that the mix is reconstitutable in water, instead of milk. In this situation, the dehydrated solids derived from milk are in an amount of about 9 to about 50 percent of the total weight of the dry instant rice porridge mix. When the dry milk proportion is so increased it is preferrable to add butterfat or butterfat substitutes, such as hydrogenated vegetable oil, and an antioxidant to preserve the butterfat or its substitutes.

Also in accordance with the preferred methods of the present invention, an alkaline metal pyrophosphate is added to this mixture of rice and dry milk. This pyrophosphate is preferably added in the proportion of about ½% pyrophosphate to about 99.5% of the rice and dry milk mixture.

Preferably, the pyrophosphate employed is a sodium acid pyrophosphate. When this preferred pyrophosphate is employed in a mix reconstitutable in milk, the pyrophosphate is preferably in the amount of about 0.25 to 2.0 percent by weight of the total mix weight. If the mix is reconstitutable in water, the pyrophosphate is preferably in the amount of about 0.10 to 1.5 percent by weight of the total mix weight.

When this preferred pyrophosphate is employed an alkaline metal orthophosphate or calcium salt is also preferably added to the rice and dry milk mixture in addition to the pyrophosphate. The alkaline metal orthophosphate or calcium salt is added in a proportion of about ¼%, along with the about ½% of pyrophosphate, to about 99.25% of the rice and dry milk mixture. Preferably the orthophosphate employed is a tricalcium phosphate. When this orthophosphate is employed in a mix reconstitutable in milk, this orthophosphate is in the amount of about 0.10 to 2.0 percent by weight of the total mix weight. If the mix is reconstitutable in water, this orthophosphate is in the amount of about 0.05 to 1.5 percent by weight of the total mix weight.

The medium grain rice employed in the preferred methods of the present invention has a higher percentage of amylopectin than a long grain rice and therefore tends to be more "sticky" than long grain rice. The long-cook process dissolves a large amount of the starch from the rice grains which results in a "sticky" mass of rice grains and dissolved starch. The "instantizing" process tends to wash contaminants and surface starch off the exterior of rice grains which otherwise tend to cause the rice grains to stick together.

However, dried instantized medium grain rice, when it is rehydrated, partially exhibits the "stickiness" of the long-cook rice porridge product because of its high amylopectin content. Short grain rice, when instantized and rehydrated, exhibits a similar "stickiness". Since the long-cook product usually employs medium grain rice as a base constituent, medium grain rice is preferred as it imparts a flavor to the final ready-to-eat product comparable to the long-cook product. However, some countries may employ short grain rice as a base constituent for the long-cook product. Thus, short grain rice may also be employed in the methods and mixes of the present invention when it is readily available.

The "matrix", or creamy constituent, of the long-cook product is normally sufficiently thick that it is difficult to determine visually how many brokens are present. Thus, the methods of the present invention may employ substantially only whole grains of rice, or substantially only brokens, or mixtures of whole grains and brokens. However, to reduce the overall cost of the mix of the present invention while visually presenting some whole grains in the dry mix, it is preferred to use a mixture of brokens and whole grains for the instant constituents. The preferred mixture has a proportion of brokens of about 75% and of whole grains of about 25%, by weight. This preferred mixture provides an economical mixture whose rehydrated texture and flavor is comparable to the long-cook product, while providing some whole grains for visual observation in the dry mix and at the surface of the ready-to-eat food preparation.

The conventional long-cook process also causes some percentage of the rice grains to break apart (typically 10–15%). As discussed hereinabove, the long-cook process also dissolves starch from the rice grains which together with starch from broken grains contributes to the stiff texture of the matrix of the final product. For the instant mix made according to the methods of the present invention, the use of medium grain rice partially achieves some of this texture.

However, according to the methods of the present invention, a thickening agent is added to assist in creating a final texture substantially similar to the long-cook product. Preferably, starch is employed as this thickening agent, although gums and dextrins may be employed for such purposes. The preferred starch contains substantial amounts of amylopectin. The preferred starch acting as this thickening agent is obtained from granulated raw rice. This rice may be of any conveniently available grain type. Alternatively, other products with a high content of non-gelantinized starch or gelantinized but thick-bodied starch, and having various particle sizes may be added to the mixture to provide the required thickening agent. Such materials may be, for example, but are not limited to, flours or purified starches from rice, corn, etc.

Granulated raw rice (or another thickening agent) is employed in one embodiment of the methods of the present invention to allow the instant rice mixture to preferentially rehydrate first. The granulated raw rice is gelatinized (cooked) by the heat employed just prior to and during the boiling portion of the rehydration by milk (or water) of the mix of the present invention. During gelatinization the starch rapidly absorbs water, but generally this occurs substantially after the rehydration of the instant rice grains which normally occurs upon contacting water (in the milk or otherwise). The granulated rice particle size is selected to be less than about 40 mesh (i.e., able to pass through a U.S. standard mesh of this size). This size is large enough to avoid "lumping" problems when milk, or water, is added to the mix to rehydrate the mix. Alternatively, as discussed hereinabove, an uncooked flour may be employed to provide the requisite thickening agent.

Non-fat dry milk solids are added in the methods of the present invention to provide an amount of milk solids equivalent to the milk solids in the long-cook product, i.e., to provide an excess of milk solids in the rehydrated final ready-to-eat product. The conventional long-cook process evaporates water from the milk in which the rice is cooking and this results in an excess of milk solids, as compared to uncooked milk.

An instant non-fat dry milk is preferably employed in the methods of the invention to provide dry milk solids and further, an agglomerated dry instant milk is preferred over a one-step spray dry instantized milk. The agglomerated milk has somewhat larger particle sizes than the spray dry instantized milk. The larger size particles are preferred as they readily dissolve in the cold milk (or water) added to rehydrate the mix and do not form lumps that the smaller particles tend to form.

However, it is also possible to prepare dry synthetic milk-like systems that are substantially identical to these non-fat dry milk solids. Such synthetic milk-like systems are well known in the art and may be prepared using sodium casineate and/or non-milk lipid sources. When such synthetic systems are to be reconstituted in water, it is preferred to add fats or oils to provide a texture (mouth feel) comparable to natural milk.

Also according to the methods of the present invention, it may be desirable to add artificial and/or natural flavors and/or colors. Such flavors and/or colors are well known in the art and may be added to enhance the taste and/or color of the ready-to-eat product prepared from the mix. Some examples made according to the methods of the present invention employed vanilla or cinnamon for this purpose.

As noted hereinbefore, the amount of dry milk added in the methods of the invention may be increased to an amount such that the dry mix is reconstitutable in water, instead of milk. When it is preferred to reconstitute the mix in water, butterfat or butterfat substitutes are preferably added to the mix to provide a taste and texture (mouth feel) substantially comparable to a conventional long-cook product. When butterfat or butterfat substitutes are added it is further preferred to add an antioxidant to avoid degeneration of the butterfat (or its substitute). Such antioxidants, or mixtures of such antioxidants, are well known in the art and may be, by way of example, but not limited to, BHA (butylated hydroxyanisole), BHT (butylated hydroxytoluene), TBHQ (tertiary-butyl hydroquinone), propyl gallate, etc.

When the mix is desired to be reconstitutable in water and butterfat (or its substitute) is added, it is preferable to also add natural and/or artificial flavors and/or colors to the mix. These flavors and/or colors may be added to improve taste and color and to overcome any potential objectionable taste from partial degradation of butterfat (or its substitute) during storage, even though antioxidants may have been added to the mix.

The methods of the present invention also add an alkaline metal pyrophosphate to the rice and milk solids mixture. This pyrophosphate is a milk protein coagulating agent and serves to coagulate or thicken the milk used to rehydrate the mix of the present invention. This thickening is in addition to the limited amount of normal denaturing of the milk proteins by heat during the reconstitution process (for the mix of the invention). However, during the long-cook process thickening of the matrix is thought to occur at least in part because of the extended heat denaturing of milk proteins.

When the dry instant porridge mix of this invention is formulated to include instant rice and a thickening agent, as well as extra milk solids, the normal five minute rehydration time for the instant rice is delayed; this delay is presently theorized and believed to be caused by competition among the mix constituents for rehydration water, which slows the rehydration rates of all the constituents of the mix. However, the addition of an alkaline metal pyrophosphate surprisingly results in an acceleration of the rate of rehydration of the pregelatinized or instant rice grains employed in the methods of the present invention. The addition of such a pyrophosphate in the methods of the present invention thus restores the normal rehydration rate to the pre-gelatinized or instant rice grains employed in the methods of the present invention. Further, the addition of such a pyrophosphate surprisingly results in the rice having a "softer" texture at all stages of rehydration when other thickening agents (such as gums or dextrins) are present. The exact mechanism for this enhanced texture is not fully understood at this time. Such a pyrophosphate also serves to regulate the consistency or thickness of the dissolved thickening agent and milk solids in the matrix to a consistency comparable to the long-cook product, even as it ages or cools. The mechanism for this process is also not fully understood at this time, but is presently theorized and believed to copy the long-cook product's mechanism.

The preferred alkaline metal pyrophosphate to be employed in the methods of the invention is sodium acid pyrophosphate. This preferred pyrophosphate is thought to form a neutral or weakly basic solution which increases the rate of denaturing of milk proteins. Further, this pyrophosphate provides a rehydrated mix consistency and flavor more comparable to the long-cook product than other pyrophosphates which may be employed in the methods of the invention.

When the preferred pyrophosphate is employed it is further preferred to also add an alkaline metal orthophosphate (such as tricalcium phosphate or divalent calcium phosphate and), or a calcium salt (such as calcium chloride), in the methods of the invention. The alkaline metal orthophosphate or calcium salt, and preferred pyrophosphate are presently theorized and believed to provide a synergistic effect which increases the favorable and unexpected pyrophosphate results that occur, i.e., accelerated rehydration, softer texture, and regulation of matrix thickness. A tricalcium phosphate is a preferred alkaline metal orthophosphate.

The preferred mix from the methods of the present invention is prepared for consumption by adding about 185 grams of the mix to about 700 ml. of milk. The milk and mix is brought to a boil with stirring to prevent scalding the milk. After reaching boiling, the milk and mix is removed from heat and allowed to sit uncovered for about five minutes. The composite product is then briefly stirred and is then ready for consumption. The consistency, texture, taste and visual appearance of the rehydrated product, so prepared, is substantially identical to the long-cook product. An alternate embodiment of the present invention which has increased milk solids is reconstitutable in water. The reconstitution of the mix with water is as described hereinbefore, but adds about 285 grams of the alternate mix to about 600 ml. of water, and with the results described hereinbefore.

The final ready-to-eat product from the mix may have raisins, nuts, cinammon, sugar, cocoa, etc., added, as desired, to modify or enhance the taste of this ready-to-eat food preparation according to the consumer's desires. Such optional additions may be any of the many traditional things and/or spices added to hot breakfast and lunch food mixes and are considered within the scope of the present invention.

The following examples will serve to illustrate specific embodiments of the product of the invention.

EXAMPLE 1

The preferred method of the present invention was employed to produce a 184.5 gram mix which consisted of: (a) 148.5 grams of instantized medium grain rice (75% brokens and 25% whole grains); (b) 16.5 grams of raw granulated medium grain rice; (c) 18 grams of non-fat dry milk (agglomerated dry milk commercially available from the Carnation Company); (d) 1 gram of sodium acid pyrophosphate; and (e) ½ gram of tricalcium phosphate.

This mix was added to 700 ml. of milk in a saucepan and heated to boiling with stirring. Upon boiling, the saucepan was removed from heat and allowed to stand five minutes. The saucepan contents were stirred briefly, transferred to bowls and tasted.

The taste, texture, consistency and appearance were substantially identical to a long-cook product started earlier so as to be finished at the same time as the final ready-to-eat product of the invention.

EXAMPLE 2

A method of the present invention was employed to produce a 183 gram mix which consisted of: (a) 148.5 grams of instantized medium grain rice (75% brokens and 25% whole grains); (b) 16.5 grams of PUREFLOW TM pregaltinized waxy corn starch ("PUREFLOW" is a trademark of the National Starch and Chemical Company); and (c) 18.5 grams of non-fat dry milk. Note that no phosphates were added in this Example.

This mix was added to 700 ml. of milk in a saucepan and heated to boiling with stirring. The saucepan was removed from the heat and allowed to stand. After five minutes the matrix was thin and the rice was firm. After ten minutes, the contents were stirred briefly and tasted as hereinbefore noted in Example 1.

The taste, texture, consistency, and appearance were substantially identical to a long-cook product started earlier so as to be finished at the same time as the final, ready-to-eat product of the invention.

EXAMPLE 3

A method of the present invention was employed to produce a 184.5 gram mix without a thickening agent which consisted of: (a) 165 grams of instantized medium grain rice (75% brokens and 25% whole grains); (b) 18 grams of non-fat dry milk; (c) 1 gram of tetrasodium pyrophosphate; and (d) ½ gram of tricalcium phosphate.

This mix was prepared as described in the examples hereinbefore. After five minutes the rice grains were quite soft and had settled to the bottom of a very watery or soupy matrix. After ten minutes the matrix was still very "soupy" and fell off the rice grains when the rice grains were spooned out of the saucepan: this ten minute matrix did not compare favorably with the matrix of a conventionally prepared long-cook proproduct. The taste was comparable to the long-cook product. The rich texture (mouth feel) was soft and comparable to the long-cook product.

EXAMPLE 4

A method of the present invention was employed to produce about a 185 gram mix which consisted of: (a) 148.5 grams of instantized medium grain rice (75% brokens and 25% whole grains); (b) 16.5 grams of raw granulated medium grain rice; (c) 18 grams of non-fat dry milk; (d) 1 gram of sodium acid pyrophosphate; (e) ½ gram of calcium chloride ($CaCl_2.H_2O$); and (d) 0.2 grams of vanilla powder.

This mix was prepared as described hereinbefore. After five minutes, the "matrix" had excellent body and the rice grains had a slightly firmer (as opposed to softer) texture and mouth feel, when compared to a long-cook product, prepared as described hereinbefore.

EXAMPLE 5

A method of the present invention was employed to produce a 286.5 gram mix which consisted of: (a) 148.5 grams of instantized medium grain rice (75% brokens and 25% whole grains); (b) 16.5 grams of raw granulated medium grain rice; (c) 1 gram of sodium acid pyrophosphate; (d) ½ gram of tricalcium phosphate; (e) 100 grams of non-fat dry milk; and (f) 20 grams of a dehydrated butter powder manufactured by MidAmerica Farms as a source of butterfat.

This mix was added to 600 ml. of water in a saucepan and heated to boiling with stirring. Upon boiling, the saucepan was removed from the heat and allowed to stand five minutes. The saucepan contents were stirred briefly, transferred to bowls and tasted.

The texture, consistency and appearance were substantially identical to a long-cook product started earlier so as to be finished at the same time as the final ready-to-eat product of the invention. The taste of the ready-to-eat product of the invention was substantially similar to the long-cook product and also had a mild buttery flavor.

Many other variations and modifications may be made in the product and techniques hereinbefore described, by those having experience in this technology, without departing from the concept of the present invention. Accordingly, it should be clearly understood that the product and methods referred to in the foregoing description are illustrative only and are not intended as limitations on the scope of the invention.

What is claimed is:

1. A method for producing a dry instant rice porridge composition, comprising the steps of:

combining a portion of whole grains of dried pregelatinized rice with a portion of broken grains of dried pregelatinzed rice such that some of said whole grains are visible in said dry composition and at the surface of the ready-to-eat food preparation;

adding and mixing therewith a thickening agent in an amount sufficient to assist in creating a final texture in said ready-to-eat food preparation substantially similar to a long-cook rice porridge;

and adding and mixing therewith dehydrated milk solids in an amount sufficient to provide an amount of milk solids in said ready-to-eat food preparation equivalent to the milk solids in said long-cook rice porridge.

2. The method of claim 1, further comprising the step of:

adding and mixing therewith an alkaline metal pyrophosphate in a dry solid form in an amount sufficient to accelerate the rate of rehydration of said whole and broken grains and to regulate the consistency of said ready-to-eat food preparation to that comparable to said long-cook rice porridge.

3. The method of claim 2, further comprising the step of:

adding and mixing therewith an alkaline metal orthophosphate in an amount sufficient to further enhance the rehydration rate of said whole and broken grains and also the regulation of the consistency of said ready-to-eat food preparation to that comparable to said long-cook rice porridge.

4. The method of claim 3, wherein said thickening agent is granulated uncooked rice.

5. The method of claim 4, wherein said pyrophosphate is sodium acid pyrophosphate.

6. The method of claim 5, wherein said alkaline metal orthophosphate is tricalcium phosphate.

7. The method of claim 2, wherein said alkaline metal orthophosphate is a divalent calcium orthophosphate.

8. The method of claim 2, further comprising the step of:

adding and mixing therewith a calcium salt in an amount sufficient to further enhance the rehydration rate of said whole and broken grains and also to regulate the consistency of said ready-to-eat food preparation to that comparable to said long-cook rice porridge.

9. The method of claim 8, wherein said calcium salt is calcium chloride.

10. A dry instant rice porridge mix reconstitutable in milk, comprising:

a mixture of whole grains and broken grains of dried pregelatinized rice having a proportion of whole grains sufficient to provide some whole grains for visual observation in said dry mix and at the surface of the ready-to-eat food preparation;

a thickening agent being in an amount sufficient to assist in creating a final texture in said ready-to-eat food preparation substantially similar to a long-cook rice porridge; and non-fat dry milk solids being in an amount sufficient to provide an amount of milk solids in said ready-to-eat food preparation equivalent to the milk solids in said long-cook rice porridge.

11. The mix of claim 10, further comprising:

an alkaline metal pyrophosphate being in an amount sufficient to accelerate the rate of rehydration of said whole and broken grains and to regulate the consistency of said ready-to-eat food preparation to that comparable to said long-cook rice porridge.

12. The mix of claim 11, further comprising:

an alkaline metal orthophosphate being in an amount sufficient to further enhance the rehydration rate of said whole and broken grains and also the regulation of the consistency of said ready-to-eat food preparation to that comparable to said long-cook rice porridge.

13. The mix of claim 12, wherein said alkaline metal orthophosphate is a divalent calcium orthophosphate.

14. The mix in claim 12, wherein said thickening agent is granulated uncooked rice.

15. The mix of claim 14, wherein said pyrophosphate is sodium acid pyrophosphate.

16. The mix of claim 15, wherein said alkaline metal orthophosphate is tricalcium phosphate.

17. The mix of claim 16, wherein said whole grains and broken grains are in the amounts of about 25 percent and about 75 percent respectively, by weight, and said rice grains are in the amount of about 70 to 90 percent by weight of the total mix weight, said granulated rice is in the amount of about 4 to 15 percent by weight of the total mix weight, said dry milk solids are in the amount of about 9 to 12 percent by weight of the total mix weight, said pyrophosphate is in the amount of about 0.25 to 2.0 percent by weight of the total mix weight, and said tricalcium phosphate is in the amount of about 0.10 to 2.0 percent by weight of the total mix weight.

18. The mix of claim 11, further comprising:

a calcium salt being in an amount sufficient to further enhance the rehydration rate of said whole and broken grains and also the regulation of the consistency of said ready-to-eat food preparation to that comparable to said long-cook rice porridge.

19. The mix of claim 18, wherein said calcium salt is calcium chloride.

20. A dry instant rice porridge mix reconstitutable in water, comprising:

a mixture of whole grains and broken grains of dried pregelatinized rice having a proportion of whole grains sufficient to provide some whole grains for visual observation in said dry mix, and at the surface of the ready-to-eat food preparation;

a thickening agent being in an amount sufficient to assist in creating a final texture in said ready-to-eat food preparation substantially similar to a long-cook rice porridge;

dehydrated solids derived from milk being in an amount sufficient to provide an amount of milk solids in said ready-to-eat food preparation equivalent to the milk solids in said long-cook rice porridge; and an alkaline metal pyrophosphate being in an amount sufficient to accelerate the rate of rehydration of said mixture of dried pregelatinized rice and to regulate the consistency of said ready-to-eat food preparation to that comparable to said long-cook rice porridge.

21. The mix of claim 20, further comprising:

an alkaline metal orthophosphate in an amount sufficient to further enhance the rehydration rate of said whole and broken grains and also the regulation of the consistency of said ready-to-eat food preparation to that comparable to said long-cook rice porridge.

22. The mix of claim 21, wherein said thickening agent is granulated uncooked rice.

23. The mix of claim 22, wherein said pyrophosphate is sodium acid pyrophosphate.

24. The mix of claim 23, wherein said alkaline metal orthophosphate is tricalcium phosphate.

25. The mix of claim 24, wherein said whole grains and broken grains are in the amounts of about 25 percent and about 75 percent respectively, by weight, and said rice grains are in the amount of about 50 to 90 percent by weight of the total mix weight, said granulated rice is in the amount of about 4 to 15 percent by weight of the total mix weight, said milk solids are in the amount of about 9 to 50 percent by weight of the total mix weight, said pyrophosphate is in the amount of about 0.10 to 1.5 percent by weight of the total mix weight, and said tricalcium phosphate is in the amount of about 0.05 to 1.5 percent by weight of the total mix weight.

26. The mix of claim 23, wherein said dehydrated solids contain sodium casineate.

27. The mix of claim 21, further comprising: butterfat in an amount sufficient to provide a taste and mouth feel substantially comparable to said long-cook rice porridge.

28. The mix of claim 27 further comprising:
an antioxidant in an amount sufficient to avoid degeneration of said butterfat.

29. The mix of claim 21, further comprising: non-milk lipids in an amount sufficient to provide a taste and mouth feel substantially comparable to said long-cook rice porridge.

30. The mix of claim 20, further comprising:
a calcium salt in an amount sufficient to further enhance the rehydration rate of said whole and broken grains and also the regulation of the consistency of said ready-to-eat food preparation to that comparable to said long-cook rice porridge.

31. The mix of claim 30, wherein said calcium salt is calcium chloride.

32. A dry instant rice porridge mix reconstitutable in milk, comprising:

a mixture of whole grains and broken grains of instant rice being in an amount of about 70 to 90 percent by weight of said porridge mix weight, said mixture having a proporation of whole grains of about 25 percent and of broken grains of about 75 percent by weight;

granulated uncooked rice being in the amount of about 4 to 15 percent by weight of said porridge mix weight, said granulated uncooked rice acting as a thickening agent;

non-fat dry milk solids being in the amount of about 9 to 12 percent by weight of said porridge weight;

sodium acid pyrophosphate being in the amount of about 0.25 to 2.0 percent by weight of said porridge mix weight, said sodium acid pyrophosphate being an alkaline metal pyrophosphate; and tricalcium phosphate being in the amount of about 0.10 to 2.0 percent by weight of said porridge mix weight, said tricalcium phosphate being an alkaline metal orthophosphate.

33. A dry instant rice porridge mix reconstitutable in water, comprising:

a mixture of whole grains and broken grains of instant rice being in an amount of about 50 to 90 percent by weight of said porridge mix, said mixture having a proportion of whole grains of about 25 percent and of broken grains of about 75 percent, by weight;

granulated uncooked rice being in the amount of about 4 to 15 percent by weight of said porridge mix weight, said granulated uncooked rice acting as a thickening agent;

dehydrated solids derived from milk being in the amount of about 9 to 50 percent by weight of said porridge mix weight;

sodium acid pyrophosphate being in the amount of about 0.10 to 1.5 percent by weight of said porridge mix weight, said sodium acid pyrophosphate being an alkaline metal pyrophosphate; and tricalcium phosphate being in the amount of about 0.05 to 1.5 percent by weight of said porridge mix weight, said tricalcium phosphate being an alkaline metal orthophosphate.

34. The mix of claim 33, further comprising:
an ingredient selected from the group consisting of butterfat and non-milk lipids in an amount sufficient to provide a taste and mouth feel substantially comparable to a conventional long-cook porridge rice; and
an antioxidant in an amount sufficient to avoid degeneration of said butterfat.

* * * * *